United States Patent

[11] 3,578,984

[72] Inventor John E. Ryley
Ilford, England
[21] Appl. No. 782,239
[22] Filed Dec. 9, 1968
[45] Patented May 18, 1971
[73] Assignee The Plessey Company, Limited
Ilford, England
[32] Priority Dec. 14, 1967
[33] Great Britain
[31] 56940/67

[54] MASTER/SLAVE SWITCHING CIRCUIT EMPLOYING INSULATED-GATE FIELD-EFFECT TRANSISTORS
11 Claims, 5 Drawing Figs.

[52] U.S. Cl. .... 307/221, 307/279, 307/304
[51] Int. Cl. .... G11c 19/00, H03k 23/08
[50] Field of Search .... 307/221, 251, 279, 304

[56] References Cited
UNITED STATES PATENTS
3,191,061 6/1965 Weimer .... 307/304X
3,363,!15 1/1968 Stephenson et al. .... 307/304X

*Primary Examiner*—Donald D. Forrer
*Assistant Examiner*—John Zazworsky
*Attorney*—Scrivener, Parker, Scrivener and Clarke

ABSTRACT: A master/slave switching circuit comprising a master bistable defined by a pair of insulated gate field-effect transistors having associated with them load field-effect transistors and a slave bistable switch defined by a further pair of field-effect transistors also having insulated gate field-effect transistor loads connected there to the master bistable and the slave bistable being interconnected by insulated gate field-effect transistors such that if the state of the master bistable is changed in response to a clock pulse applied to a terminal the state of the slave bistable is also changed, the response of the master bistable to input clock pulses being controlled in accordance with the state of input signals applied to terminals.

Patented May 18, 1971 3,578,984

2 Sheets-Sheet 1

Figures 1A, 1B:
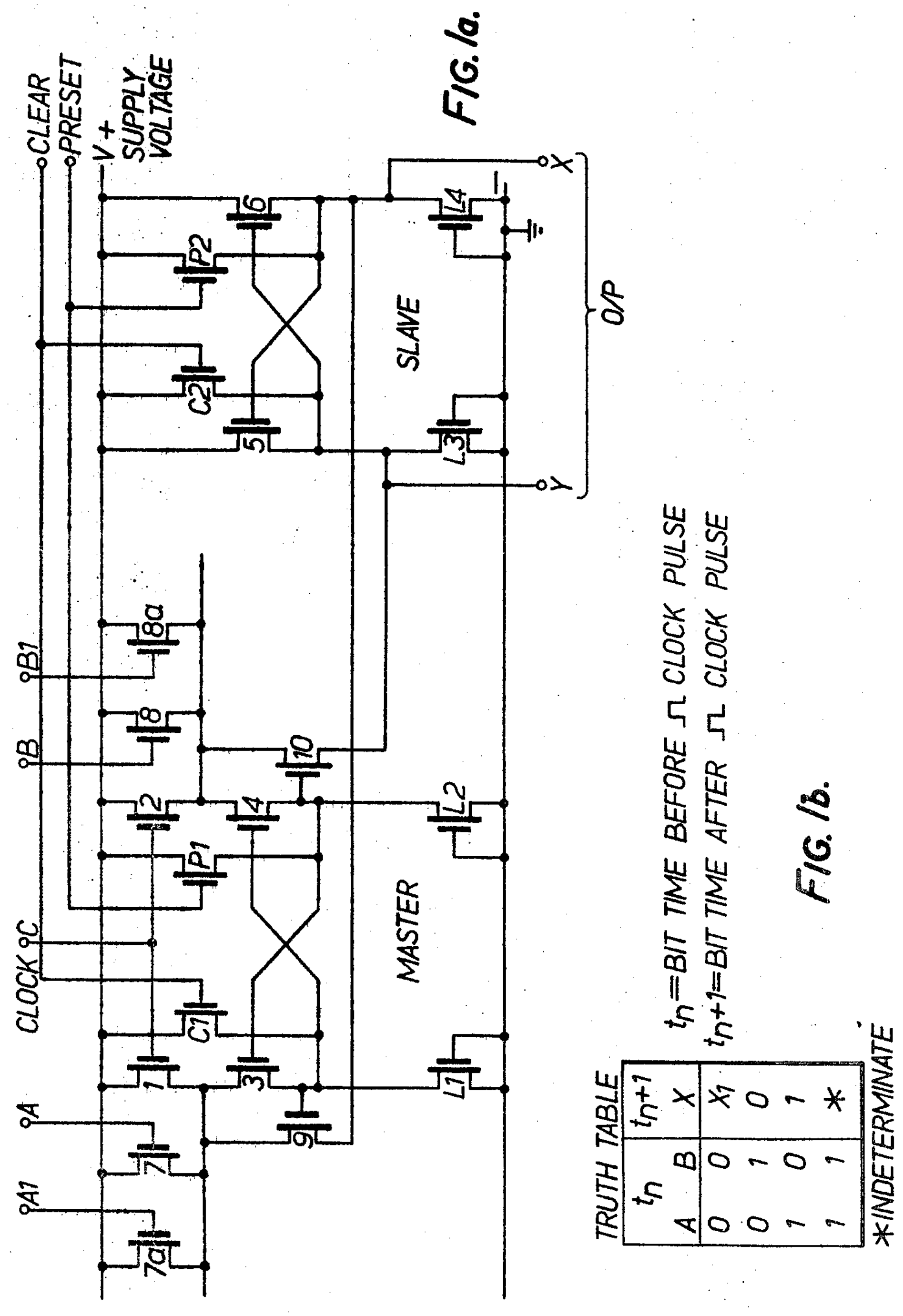

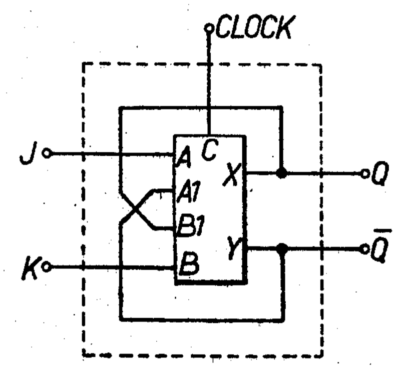
FIG. 2a.
TRUTH TABLE
| $t_n$ | | $t_{n+1}$ |
|---|---|---|
| J | K | Q |
| 0 | 0 | $Q_n$ |
| 0 | 1 | 0 |
| 1 | 0 | 1 |
| 1 | 1 | $\overline{Q}_n$ |
$t_n$ = BIT TIME BEFORE ⎍ CLOCK PULSE
$t_{n+1}$ = BIT TIME AFTER ⎍ CLOCK PULSE
FIG. 2b.
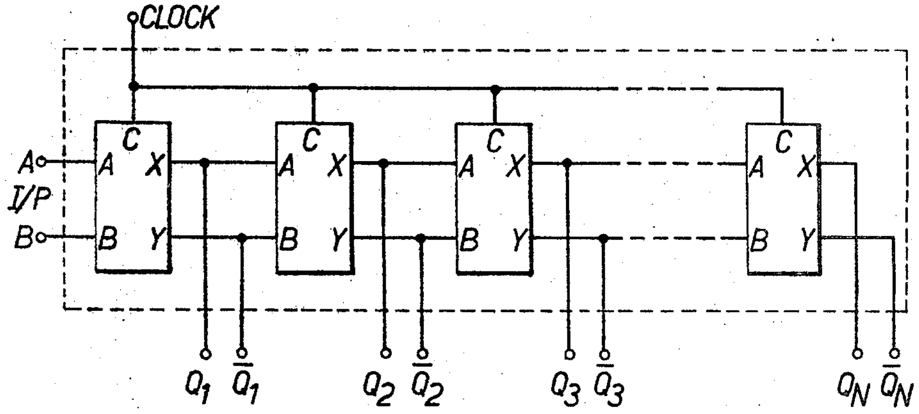
FIG. 3.

MASTER/SLAVE SWITCHING CIRCUIT EMPLOYING INSULATED-GATE FIELD-EFFECT TRANSISTORS

This invention relates to switching circuits and more particularly it relates to so-called master/slave switching circuits, that is to say, circuits in which a master switch is operated in response to the sense of a switching pulse tending towards one polarity and a slave switch is operated as the sense of the pulses tends towards the opposite polarity. Thus in one example of a master/slave switching circuit to which a positive clock pulse is applied the master switch may operate as the leading edge of the clock pulse changes positively and the slave switch would operate to assume the same state as the master switch coincident with the trailing edge of the clock pulse which changes negatively.

According to the present invention a master/slave switching circuit arrangement comprises a two-state master switch defined by a pair of IGFET's i.e. insulated gate field-effect transistors (hereinafter called the master pair) cross coupled to form a bistable multivibrator, load means being associated with each IGFET of the master pair, and a two-state slave switch defined by a further pair of IGFET's (hereinafter called the slave pair) which are similarly cross coupled to define a bistable multivibrator, further load means being associated with each of the IGFET's of the slave pair, the said master switch and the said slave switch being interconnected by coupling means the arrangement being such that if the state of the master switch is changed in response to a clock pulse the state of the slave switch is also changed.

Clock pulses may be applied to the master switch through the interconnected gate contacts of a pair of gating IGFET's which may have their drain contacts connected respectively to the source contacts of the IGFET's of the master pair and their source contacts connected to a first supply rail of opposite polarity to a second supply rail to which the master and slave load means are connected.

Each gating IGFET may have connected in parallel with it one or more further gating IGFET's such that the presence or absence of a signal on the gate contacts of these further gating IGFET's controls the response of the master switch to an applied clock pulse.

The load means may comprise two IGFET's (hereinafter called the master load IGFET's) which may be associated respectively with a different one of the IGFET's of the master pair and the further load means may similarly comprise two IGFET's (hereinafter called the slave load IGFET's).

Each of the slave load IGFET's and each of the master load IGFET's may have its gate contact and drain contact connected to the second supply rail, its source contact being directly connected to the drain contact of the particular IGFET of the master pair or the slave pair, as the case may be, with which it is associated.

The coupling means interconnecting the slave and master switches may comprise two IGFETs's (hereinafter called coupling IGFET's) which may be arranged to interconnect the IGFET's of the master pair with the IGFET's of the slave pair. One of the coupling IGFET's may have its gate contact connected to a drain contact of one of the IGFET's of the master pair, the source contacts of the said one of the coupling IGFET's and the said one IGFET of the master pair being interconnected and the drain contact of the said one coupling IGFET being connected to the drain contact of one IGFET of the slave pair, thereby to couple one IGFET of the master pair with one IGFET of the slave pair, the other IGFET of the master pair and the other IGFET of the slave pair being similarly coupled by means of the other coupling IGFET.

Two additional pairs of IGFET's may be utilized for preset and clear purposes and these will hereinafter be referred to as first and second pairs of reset IGFET's. The first reset pair of IGFET's may have their respective drain contacts connected respectively to the drain contacts of the IGFET's of the master pair, their source contacts being connected to the first supply rail and the second reset pair may be similarly connected to the slave pair of IGFET's, the gate contact of one IGFET of the first reset pair and the gate contact of one IGFET of the second reset pair being interconnected to form a "clear" pulse input line and the other gate electrodes of the first and second reset pairs of IGFET's being interconnected to define a "-preset" pulse input line.

The master/slave switching circuit according to this invention may be used as a J–K flip-flop in one embodiment of the invention or according to an alternative embodiment of the invention several master/slave switching circuits may be used to form a shift register.

Some exemplary embodiments of the invention will now be described with reference to the accompanying drawings in which, FIG. 1*a* is a circuit diagram of a master/slave switching circuit according to the invention;

FIG. 1*b* is a truth table relating to the circuit of FIG. 1*a;*

FIG. 2*a* is a schematic block diagram of a J–K flip-flop utilizing a circuit similar to the circuit FIG. 1*a;*

FIG. 2*b* is a truth table relating to the J–K flip-flop of FIG. 2*a*, and FIG. 3 is a block diagram of a shift register which utilizes several circuits each of which are similar to the circuit of FIG. 1*a*.

Referring to FIG. 1*a*, a master/slave circuit comprises a pair of IGFET's 3, 4 having their gate contacts and drain contacts cross coupled to define a master bistable multivibrator. The load of IGFET 3 is an IGFET L1 the source contact of which is connected to the drain contact of IGFET 3 and the drain and gate contacts of IGFET L1 are each connected to the negative supply rail. The load of IGFET 4 is formed by an IGFET L2 connected in a similar manner to IGFET L1. Thus IGFET's 3 and 4 form the master pair and IGFET's L1 and L2 form the master load.

IGFET's 5 and 6 are cross coupled in a similar manner to IGFET's 3 and 4 to define a slave bistable multivibrator having connected thereto load IGFET's L3 and L4. Thus IGFET's 5 and 6 form the slave pair and IGFET's L3 and L4 form the slave load. The slave bistable is coupled to the master bistable by means of coupling IGFET's 9 and 10. The drain contact of coupling IGFET 9 being connected to the drain contact of IGFET 6 of the slave pair while the gate contact of IGFET 9 is connected to the drain contact of IGFET 3 of the master pair, and the source contact of IGFET 9 is connected to the source contact of IGFET 3. The other coupling IGFET 10 is connected in a similar manner between IGFET 4 of the master pair and IGFET 5 of the slave pair. Clock pulses are applied to the source contacts of the master pair via gating IGFET's 1 and 2. The drain contact of IGFET 1 being connected to the source contact of IGFET 3 of the master pair whilst the source contact of IGFET 1 is connected to the positive supply line. Gating IGFET 2 is similarly connected between the positive supply line and IGFET 4, the gate contacts of the gating IGFET's 1 and 2 being interconnected to form a clock pulse input line. Further gating IGFET's 7 and 7*a* having provision for gating pulse input A and A1 at their respective gate contacts are connected in parallel with gating IGFET 1 and further gating IGFET's 8 and 8*a* having provision for gating pulse inputs B and B1 at their respective gate contacts may be connected in parallel with the IGFET 2.

In the truth table of FIG. 1*b* which applies to the circuit of FIG. 1*a* positive logic is assumed, i.e. logic level 0 = a voltage near earth which in this case earth corresponds to the negative supply line and logic level 1 is a voltage which is positive with respect to earth; T*n* = bit time before clock pulse: T*n*+1 = bit time after a clock pulse; input A = input A1 and input B = input B1, and clock pulses are positive with respect to earth.

Thus operation of the circuit can be seen from the truth table. If for example the gating inputs A, A1 and B, B1 are set to logic level 0 IGFET's 7, 7*a*, 8 and 8*a* will be ON and a clock pulse, the effect of which is to switch IGFET's 1 and 2 OFF for the clock pulse duration, will have no affect on an output taken across the slave load pair at terminals X and Y.

If on the other hand input terminals A1 and A are set to logic level 0 and input terminals B1 and B are set to 1 the X and Y output terminals will be set respectively to logic levels 0 and 1 in response to an applied clock pulse or will stay at logic levels 0 and 1 respectively if this is how they were set prior to the application of the clock pulse.

In order to understand this mode of operation wherein A and A1 are set to logic level 0 and input terminals B and B1 are set to logic level 1, assume that before the clock pulse was applied IGFET 3 was OFF and IGFET 4 therefore was ON. As the leading edge of the clock pulse rises positively IGFET's 1 and 2 turn OFF. IGFET 4 thus also turns OFF since its current path is broken and IGFET 3 turns ON drawing current through IGFET's 7 and 7*a* which are switched ON since A1 and A are set at logic level 0. Thus IGFET's 3 and 4 of the master pair change state as the leading edge of the clock pulse changes positively.

Switching the IGFET's of the slave bistable is effected as follows. Assuming that the condition wherein IGFET 3 is OFF and IGFET 4 is ON obtains prior to the application of a clock pulse, then the gate of coupling IGFET 9 is negative; IGFET 9 is ON and therefore the drain of IGFET 9 and the gate of IGFET 5 are positive. IGFET 5 is therefore OFF and IGFET 6 is on, X and Y therefore are set to logic levels 1 and 0 respectively. Since IGFET 4 is ON, the gate of IGFET 10 is positive and therefore IGFET 10 is OFF.

When a clock pulse is applied to the gates of gating IGFET's 1 and 2 as has already been established IGFET 4 switches OFF and IGFET 3 switches ON. Although the gate of coupling IGFET 10 goes negative as IGFET 4 switches OFF, IGFET 10 does not conduct since no current path is provided through IGFET 2 or IGFET 8 or 8*a*. IGFET 9 stops ON to conduct through IGFET 7 and 7*a*.

As the trailing edge of the clock pulse changes negatively however IGFET's 1 and 2 start to conduct again and a current path is provided for coupling IGFET 10 which conducts through IGFET 2 to drive the gate of IGFET 6 positive and switch it OFF. The gate of IGFET 5 is thus driven negative and IGFET 5 conducts. X and Y are therefore set to logic levels 0 and 1 respectively. Thus the slave bistable switches on the trailing edge of the clock pulse as it changes negatively. Unless the logic levels applied to A1, A, B and B1 are reset further clock pulses will produce no effect on the outputs X and Y. If for example A and A1 were reset to logic level 1 and B and B1 were reset to logic level 0, then the next clock pulse would cause X and Y to be reset to 1 and 0 respectively.

Thus with suitable logic levels set on terminals A and A1, and B and B1, when the clock pulse changes from logic level 0 to 1 the master bistable switches but the slave bistable remains unchanged and when the clock pulse changes back to 0 the slave bistable switches to the same state as the master bistable which will then remain unchanged.

For operation of the circuit so far described it will be appreciated that the further gating IGFET's 7*a* and 8*a* which provide the gating input terminals A1 and B1 are not strictly necessary since they have in the examples described been set to the same logic levels as their counterparts A and B, and therefore in effect provide an AND facility.

To expand the master/slave gating or steering facility these input terminals A1 and B1 may be cross coupled with the output terminals X and Y to produce a J–K flip-flop as shown in FIG. 2*a* having a truth table as shown in FIG. 2*b*. This J–K flip-flop will therefore utilize 16 IGFET's. The operation of the J–K flip-flop and its related truth table are well known and will not be described herein. To provide a "clear" facility IGFET C1 and IGFET P1 may be connected, as shown in FIG. 1*a* in chain dashed lines, between the drain contacts of the master pair and the positive supply rail, and IGFET's C2 and P2 may be connected respectively in parallel with IGFET's 5 and 6 of the slave pair. The gate contacts of IGFET's C1 and C2 are interconnected to form a "clear" pulse input line and the gate contacts of IGFET's P1 and P2 are similarly interconnected to form a "preset" pulse input line. In normal operation the "-clear" and "preset" inputs are held at logic level 1. By taking the "clear" input to 0 both master and slave bistables are switched such as to give an output X=0 and Y=1 and by taking the "preset" input to 0 the bistables are switched to the opposite state i.e. X=1 and Y=0. The "clear" and "preset" functions are independent of the state of any other inputs but "-clear" and "preset" inputs should not be taken to 0 logic level together.

FIG. 3 shows a shift register arrangement formed from four master/slave units as described with reference to FIG. 1*a* without gating IGFET 7*a* and 8*a* or the IGFET's shown connected in chain dashed lines. By connecting the A and B gating terminals to the X and Y output terminals of the previous stage a shift register having any number of stages may be produced. It will be appreciated that by adding to each stage the additional IGFET's C1, C2, P1 and P2 "preset" and "-clear" facilities may be provided and in this case 18 IGFET's will be required for each stage whereas with the arrangement shown in FIG. 3 only 14 IGFET's for each stage are needed.

The master/slave switching arrangement according to the invention offers the advantage that the master/slave function may be performed with a single clock pulse using the minimum number of IGFET's and moreover this arrangement is suitable for use from DC up to a clock frequency limited by the performance of the IGFET's. The circuit is suitable for construction in integrated form and could be incorporated as part of a complex integrated system.

We claim:

1. A master/slave switching circuit arrangement comprising a two-state master switch defined by a pair of IGFET's i.e. insulated gate field-effect transistors (hereinafter called the master pair) cross coupled to form a bistable multivibrator, load means being associated with each IGFET of the master pair and a two-state slave switch defined by a further pair of IGFET's (hereinafter called the slave pair) which are similarly cross coupled to define bistable multivibrator, further load means being associated with each IGFET of the slave pair, the said master switch and the said slave switch being interconnected by coupling means, the arrangement being such that if the state of the master switch is changed in response to a clock pulse, the state of the slave switch is also changed.

2. A master/slave switching circuit arrangement as claimed in claim 1 wherein clock pulses are applied to the master switch through interconnected gate contacts of a pair of gating IGFET's having their drain contacts connected respectively to the source contacts of the IGFET's of the master pair and their source contacts connected to a first supply rail of opposite polarity to a second supply rail to which the master and slave load means are connected.

3. A master/slave switching circuit arrangement as claimed in claim 2 wherein each gating IGFET has connected in parallel with it one or more further gating IGFET's such that the presence or absence of a signal on the gate contacts of these further gating IGFET's controls the response of the master switch to an applied clock pulse.

4. A master/slave switching circuit arrangement as claimed in claim 3 wherein the load means comprises two IGFET's hereinafter called the master load IGFET's, which are associated respectively with a different one of the IGFET's of the master pair and wherein the further load means comprises two IGFET's hereinafter called the slave load IGFET's.

5. A master/slave switching circuit arrangement as claimed in claim 4 wherein each of the slave load IGFET's and each of the master load IGFET's has its respective gate contact and drain contact connected to the said second supply rail its source contact being directly connected to the drain contact of the particular IGFET of the master pair or slave pair as the case may be with which it is associated.

6. A master/slave switching circuit arrangement as claimed in claim 5 wherein the coupling means interconnecting the slave and master switches comprise two IGFET's herein called coupling IGFET's which are arranged to interconnect the IGFET's of the master pair with IGFET's of the slave pair.

7. A master/slave switching circuit arrangement as claimed in claim 6 wherein one of the coupling IGFET's has its gate contact connected to the drain contact of one of the IGFET's of the master pair the source contacts of one of the coupling IGFET's and the said one IGFET of the master pair being interconnected and the drain contact of the said one coupling IGFET being connected to the drain contact of one IGFET of the slave pair, thereby to couple one IGFET of the master pair with one IGFET of the slave pair, the other IGFET of the master pair and the other IGFET of the slave pair being similarly coupled by means of the other coupling IGFET.

8. A master/slave circuit arrangement as claimed in claim 7 comprising two additional pairs of IGFET's utilized for "-preset" and "clear" purposes and hereinafter referred to as first and second pairs of reset IGFET's.

9. A master/slave circuit arrangement as claimed in claim 8 wherein the first reset pair of IGFET's have their respective drain contacts connected respectively to the drain contacts of the IGFET's of the master pair, their source contacts being connected to the said first supply rail and the second reset pair being similarly connected to the slave pair of IGFET's, the gate contact of one IGFET of the first reset pair and the gate contact of one IGFET of the second reset pair being interconnected to form a clear pulse input line and the other gate electrodes of the first and second reset pairs of IGFET's being interconnected to define a preset input line.

10. A master/slave switching circuit arrangement as claimed in claim 7, wherein the drain contacts of said slave pair of IGFET's are cross connected with the gate contacts of the further gating IGFET's to define a J–K flip-flop.

11. A plurality of master/slave circuit arrangements as claimed in claim 1 wherein the said circuit arrangements are connected serially, with the output of one said circuit arrangement feeding the input of another said circuit arrangement, clock pulses being applied to the said circuit arrangements over a common clock pulse line thereby to define a shift register.